United States Patent Office 2,847,550
Patented Aug. 12, 1958

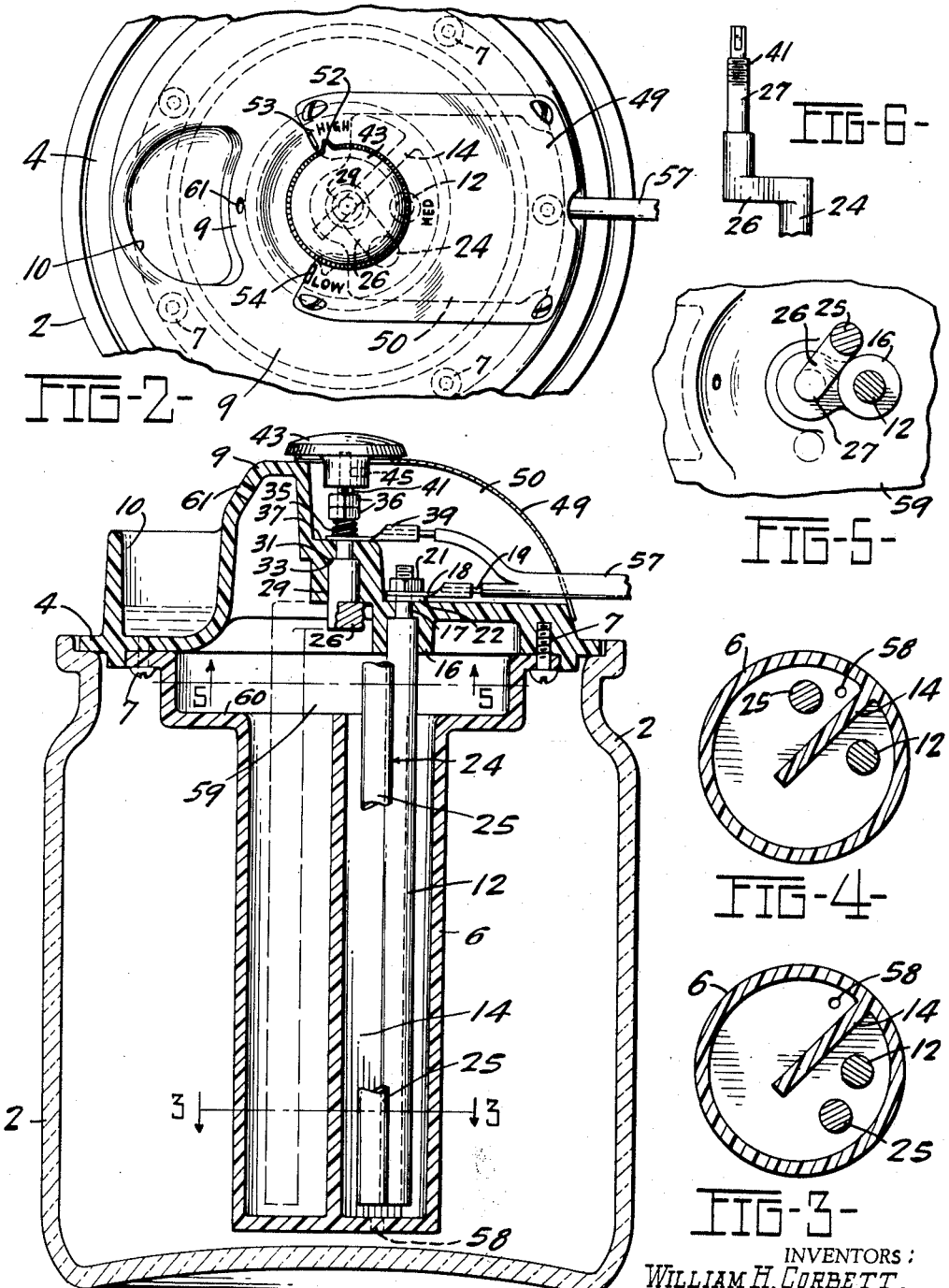

2,847,550
ELECTRIC STEAM VAPORIZER

William H. Corbett, Joy B. Schmitt, and Albert D. Brunell, Somerset, Pa., assignors to The De Vilbiss Company, Toledo, Ohio, a corporation of Ohio Application December 12, 1957, Serial No. 702,459

6 Claims. (Cl. 219—40)

This invention relates to vaporizers for heating or vaporizing water or other liquids, usually in conjunction with a medicinal agent. More particularly, this invention relates to such an instrument in which heat is generated by the passage of an electrical current between spaced electrodes submerged in the liquid, and the electrodes are adjustably positioned for governing the rate of heat generation.

This type of vaporizer is usually employed to produce steam, carrying volatilized medicinal substances, for inhalation by persons suffering from respiratory ailments. Steam alone from these vaporizers without an additive agent may be used effectively in such treatment.

Conventional vaporizers of this design include a comparatively large container for the water to be vaporized, and a small receptacle for a special therapeutic agent, such as tincture of benzoin.

The principal factors affecting the rate of electrical flow and the proportionally related heat or steam production, are the area and spacing of the electrodes, and the electrolytic properties of the water. The shape and fixed positioning of the electrodes are selected to give the most desirable rate of steam discharge with water of an average mineral content supplemented by a pinch of table salt. The results attained through this practice have proved generally satisfactory.

However, in view of the range in hardness of water throughout this country and elsewhere, there is a difference in performance of the vaporizers in various localities. Where the water is unusually soft, the steam production would be very poor without the addition of extra salt. In other areas the supply of water is of severe hardness with a content of mineral salts permitting too high a current flow and causing a turbulent boiling action.

This lack of uniformity in performance is, of course, very objectionable in the extreme cases and is undesirable in many situations where a particular steam discharge rate would be preferred for treating a certain ailment or personally favored by the patient.

Attempts have been made to produce vaporizers capable of operating satisfactorily under these differing conditions and requirements. The resulting designs have included adjustable mountings for the electrodes by which the distance between them may be varied to inversely affect steam generation. Also, slidable shielding devices have been provided for intercepting more or less of the electrical path between the electrodes and thus govern the rate of steam formation.

While this general approach to the solution of the problem is considered the most logical, the structures so far evolved have not proved fully successful. The cause of this deficiency evidently resides in the limited space within the usual electrode casing. This housing element is desirably small in order that the water there, separated from that in the main container, may be heated quickly to start the steam flow, and also to closely enclose the electrodes to better guard against dangerous short circuiting.

In the confined area of such casings there is accordingly insufficient room for wide separation of movably mounted electrodes, while alternately the electrodes may not be positioned very close together when a shielding device is arranged for insertion between them. As a consequence, the range of control is limited on the low side with movable electrodes and on the high side when an intervening member is utilized. The latter arrangement may also be somewhat unsatisfactory for low steam control as it is difficult or inadvisable to seal the edges of the intervening member against the casing to prevent the flow of current therearound.

The principal object of this invention is to provide a vaporizer with means by which the user may control the rate of steam production throughout a more extensive range than heretofore possible.

It is a further object of the invention to provide a vaporizer with which the rate of steam discharge may be easily and quickly altered.

Another object is to provide a vaporizer which is of simple design and which may be economically fabricated.

These and other objects and advantages of the invention are attained, primarily, through the utility of both a movably mounted electrode and a partition which may be used to intervene between the electrodes. The particular offset structure of the movable electrode also contributes to the attainment of the recited objects of the invention.

In the drawings:

Figure 1 is a vertical section of a vaporizer embodying the preferred form of the invention;

Figure 2 is a broken plan view of the vaporizer of Figure 1;

Figure 3 is a section through the electrode casing of the vaporizer of Figure 1 taken on the line 3—3 thereof;

Figure 4 is a section like that of Figure 3 but showing the electrodes positioned for low steam generation instead of the high volume electrode positioning of Figures 1, 2 and 3;

Figure 5 is a broken section as would be seen looking upward in the direction of the arrows from the plane of line 5—5 of Figure 1; and Figure 6 is an elevation of the upper offset end of the movable electrode.

Referring to the drawings in more detail, the vaporizer of Figure 1 has a water jar or container 2 with its neck portion shouldered to support the vaporizer head assembly 4. A depending electrode casing 6 is secured by bolts 7 to the underside of the head assembly 4. The main body 9 of the head assembly is molded to form an open-topped medicament receptacle 10.

A stationary electrode 12 of rod form is suspended within casing 6 on one side of the vertical vane 14 which extends diametrically across the axis of the casing from one wall thereof.

The upper end of electrode 12 is centered in a depending neck 16 of the main body 9 and has a reduced, threaded shank 17 reaching up through the body for engagement with the eyelet connector 18 of terminal wire 19, and for the threaded attachment of retaining nut 21. A washer 22 is preferably placed under the eye connector 18.

The movable electrode 24 is also of general rod shape but has its main lower functioning portion 25 offset through a lateral arm 26 from its upper mounting end 27. The latter is rotatably inserted in the stepped vertical bore 29 of the body member 9, said bore being coaxially positioned in respect to the casing 6.

The electrode 24 is held vertically in place through the abutment of the shoulder 31 on its upper end against the complementary shoulder 33 of bore 29 and by the pressure of the spring 35 compressed between lock nuts 36 and the flat area 37 of the body member surrounding the upper restricted terminus of bore 29. An eyelet terminal connector 39 is held in place around the electrode by the spring 35. The upper mounting end 27 of the electrode has a portion 41 of reduced diameter upon which the locked nuts 36 are threaded and upon which the adjustment knob 43 is secured by set screw 45.

By turning the knob 43 the upper end 27 of the electrode 24 is rotated in bore 29 and the lower functioning end of the electrode may be swung in an arc of 220° from a position close to the stationary electrode 12 for highest steam production, as illustrated in Figures 1, 2, 3 and 5, to that for the least steam formation where it is swung on the other side of vane 14 from electrode 12, as depicted in the sectional view of Figure 4.

The metal shell 49 which covers the electrical connecting chamber 50 may have the "High" and "Low" markings for informative setting of the knob with its pointer 52. Preferably, the shell 49 is turned up at 53 and 54 to provide stops for the projecting pointer 52.

Other structural features of this vaporizer will be referred to in the following explanation of its operation.

Water is first placed in container 2 and a pinch of salt may be added thereto according to standard recommendations; the head assembly 4 is positioned over the container, and tincture of benzoin or some other medicinal preparation may be introduced into receptacle 10. Then, with cord 57 attached to an electrical source, current will start flowing between the electrodes, and its passage through the intervening water brings the water within electrode casing 6 to a boiling temperature.

As the formation of steam depletes the water in casing 6, a replenishing supply arrives through port 58 in the bottom of the casing from container 2. The steam from casing 6 enters steam chamber 59 formed between the flanged upper end 60 of the casing and the body 9. The steam is discharged from chamber 59 through outlet port 61 and draws upwardly into confluence medicinal vapor rising from receptacle 10. The medicament in the receptacle is slowly volatilized by heat reaching it through the wall of the steam chamber.

Should the steam generation be too fast at the "High" setting of Figures 1, 2, 3 and 5 causing undue turbulence of the water, or should a more moderate rate be desired to extend the steam formation over a longer period without the need occurring of refilling the receptacle 2, the knob 43 is turned clockwise as viewed in Figure 2 until the steam flow is slackened to the desired degree.

With this turning of the knob, the lower portion 25 of electrode 24 is swung in an arcuate path first away from the stationary electrode 12, then circling back toward it on the other side of the vertical vane 14. The path of the electrical current is accordingly gradually increased directly between the electrodes and then around the vane. The extreme distance is substantially greater than the diameter of the casing as the current is forced to travel across both sides of the vane.

The traveling movement of the electrode 24 is terminated at both limits, primarily by the abutment of the lateral arm 26 of the electrode against the side of the depending neck 16 of the main body, in which the stationary electrode is centered. Secondarily, the turning of the electrode 24 is stopped by the pointer 52 of the knob meeting projections 53 and 54 of the shell 49.

Considered noteworthy is the integrated connection between the vane 14 and the casing 6 whereby the vane has only one edge around which the current may flow.

Also of supplemental importance is the location of the inlet port 58 in the bottom of the casing at one side of the vane. This cooperates with the vane, which to some extent divides the casing into two compartments, by introducing the cooler water from the receptacle on the side of the vane opposite to that where the water is usually directly heated by the electrical current. The continuous formation of steam is thus less likely to be momentarily interrupted by the cooling effect of the additive water.

While in the foregoing there has been shown and described the preferred embodiment of this invention, it is to be understood that minor changes in the details of construction, combination and arrangement of parts may be resorted to without departing from the spirit and scope of the invention as claimed.

We claim:

1. In an electric steam vaporizer, a receptacle for water, a main body assembly with which the receptacle is associated, a pair of electrodes supported by the body assembly in spaced relation within the receptacle, a vertical partition in fixed position within the receptacle, and adjustable mounting means for one of the electrodes arranged to move said electrode from one side to the other side of the partition.

2. An electric vaporizer according to claim 1 in which the movement of said electrode is in an arcuate path.

3. An electric vaporizer according to claim 1 in which there is a casing depending from the body assembly and in which the electrodes are lodged, and the partition extends diametrically across the casing from one wall thereof.

4. An electric vaporizer according to claim 3, in which the other electrode is in fixed position on one side of the partition and there is a water inlet port on the other side of the partition.

5. An electric vaporizer according to claim 1 in which the said electrode has an upper portion, rotatable on a vertical axis, and a lower section parallel with but horizontally offset from the upper portion whereby on rotation of the upper portion the lower section is turned in an arcuate path.

6. In an electric steam vaporizer, a receptacle for water, a main body assembly with which the receptacle is associated, a pair of electrodes depending from the body assembly in spaced relation within the receptacle, a vertical partition within the receptacle, the first of the pair of electrodes being in a fixed position on one side of the partition, and adjustable mounting means for the second of the pair of electrodes so arranged that said second electrode may be selectively moved relatively closer to the first electrode and to the same side of the partition therewith and relatively farther away from the first electrode and to the opposite side of the partition from that on which the first electrode is in a fixed position.

References Cited in the file of this patent

UNITED STATES PATENTS

| | | |
|---|---|---|
| 2,387,103 | Wicks | Oct. 16, 1945 |
| 2,398,136 | Drabble et al. | Apr. 9, 1946 |
| 2,599,806 | Benchemoul | June 10, 1952 |